United States Patent [19]
Nishida

[11] Patent Number: 6,041,138
[45] Date of Patent: Mar. 21, 2000

[54] METHOD AND DEVICE FOR EXTRACTING FEATURES FROM GRAY-SCALE IMAGE AND GENERATING BOUNDARIES OF DOCUMENT ELEMENTS

[75] Inventor: Hirobumi Nishida, Yokohama, Japan

[73] Assignee: Ricoh Company, Ltd., Tokyo, Japan

[21] Appl. No.: 08/896,142

[22] Filed: Jul. 17, 1997

[30] Foreign Application Priority Data

Aug. 5, 1996 [JP] Japan .................................. 8-206268

[51] Int. Cl.[7] .................................................. G06K 9/62
[52] U.S. Cl. ................................... 382/197; 382/203
[58] Field of Search .................................. 382/190, 197, 382/198, 199, 203, 200

[56] References Cited

U.S. PATENT DOCUMENTS

| | | | |
|---|---|---|---|
| 5,621,827 | 4/1997 | Uchiyama et al. | 382/190 |
| 5,629,752 | 5/1997 | Kinjo | 355/35 |
| 5,774,585 | 6/1998 | Häring | 382/203 |
| 5,774,596 | 6/1998 | Kim | 382/242 |
| 5,920,648 | 7/1999 | Fujimoto | 382/197 |

OTHER PUBLICATIONS

L. De Floriani, "A Pyramidal Data Structure for Triangle–Based Surface Description", *IEEE Computer Graphics and Applications*, vol. 9, Mar. 1989, pp. 67–78.

T. Pavlidis, et al., "Sampling and Quantization of Bilevel Signals", *Pattern Recognition Letters*, vol. 14, No. 7, Jul. 1993, pp. 559–562.

L. Wang, et al., "Direct Gray–Scale Extraction of Features for Character recognition", *IEEE Transactions on Pattern Analysis and Machine Intelligence*, vol. 15, No. 10, Oct. 1993, pp. 1053–1067.

*Primary Examiner*—Andrew W. Johns
*Attorney, Agent, or Firm*—Oblon, Spivak, McClelland, Maier & Neustadt, P.C.

[57] ABSTRACT

A method of extracting features from a gray-scale image includes the steps of generating polygons which approximate a curved surface represented by the gray-scale image, and extracting features with respect to common edges of adjoining polygons. The method further includes the step of generating boundaries of document elements based on the features.

13 Claims, 11 Drawing Sheets

I - (2,4) → II
IV - (5,5) → V

FIG .12
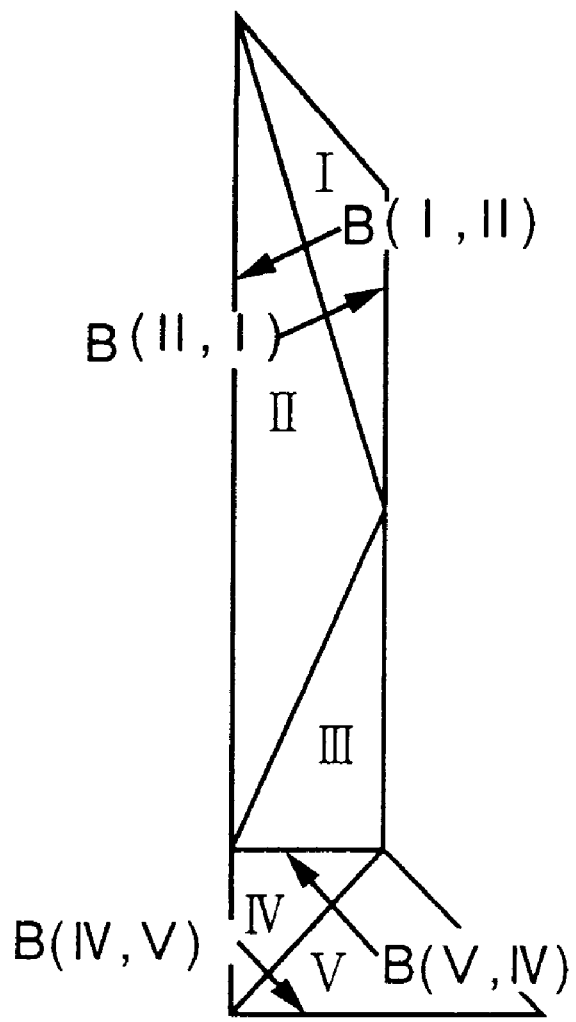
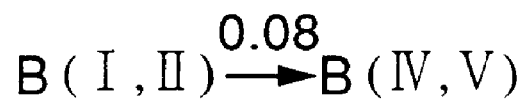
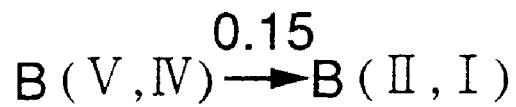

------- BOUNDARY

———— EDGES CONTRIBUTING TO BOUNDARIES

METHOD AND DEVICE FOR EXTRACTING FEATURES FROM GRAY-SCALE IMAGE AND GENERATING BOUNDARIES OF DOCUMENT ELEMENTS

BACKGROUND OF THE INVENTION

1. Field of the Invention

The present invention generally relates to feature-extraction methods and devices for character recognition or document-image analysis of gray-scale document images, and relates to feature-extraction schemes designed for character recognition or document-image analysis of images having a poor quality or low resolution. The present invention particularly relates to feature-extraction methods and devices which extract boundary features directly from gray-scale data without binarizing gray-scale images obtained from scanners or the like, and generate binary images based on the extracted boundaries.

2. Description of the Related Art

Prior-art techniques for character recognition or document-image analysis typically extract various features from binary images after binarizing gray-scale images obtained from image scanners by using a proper threshold value.

Gray-scale images obtained from image reading devices such as scanners end up sustaining various distortions during the time of an image reading process because of optical characteristics, as characterized by point-spread functions, of the image reading devices. This is indicated by Wang and Pavlidis (L. Wang and T. Pavlidis, "Direct Gray-Scale Extraction of Features for Character Recognition," IEEE Transactions on Pattern Analysis and Machine Intelligence, vol.15, no.10, pp.1053–1067, October 1993).

Because of these distortions, binary images obtained from gray-scale images in a straightforward manner end up losing some important information, which is a main reason for errors in recognition processes. Wang and Pavlidis maintain that importance should be placed on analysis of curved-surface structures by treating a gray-scale image as a curved surface when extracting features for the purpose of recognition.

The above publication discloses a method of extracting various "geographical" features such as ridges, ravines, and saddle points from a curved surface of a gray-scale image by employing differential-geometry operations. Ridges are lines where gray-scale values become a local maximum, and ravines are lines along which local minimums are found. Saddle points define a position which is a local maximum along a line in one direction, but is a point of a local minimum in a perpendicular direction.

The above method assumes that skeleton lines of character strokes correspond to ridges of the curved surface. Based on this assumption, this method extracts features of skeleton lines of strokes directly from gray-scale images, and the extracted features are supposed to be compatible to those obtained by thinning lines in binary images.

This method, however, has several disadvantages. There are vast resources of effective algorithms for character recognition which employ structural and statistical features of character boundaries (contours), as well as algorithms which use stroke skeletons. Unfortunately, the method of Wang and Pavlidis is not suitable for use in boundary-based recognition algorithms. Namely, this method cannot draw on valuable resources of technology which have accumulated over the years with regard to boundary-based recognition algorithms, and, thus, cannot be used as a general-purpose algorithm.

When lines are sufficiently thin, it is easy to find ridges. When lines are thick, however, the task of finding accurate positions of ridges is no longer easy. Further, differential operations are needed for detecting ridges, ravines, and saddle points, but some difficulties are expected when the differential operations are actually applied to digital images. In particular, a large number of parameters need to be determined in practical applications as in the case of solving differential equations in numerical analysis. Adjustment of these parameters is known to be a rather daunting task.

Many general-purpose algorithms are known with regard to edge detection and boundary (contour) extraction. It should be noted, however, that document images are supposed to be binary in their original form but obtained as gray-scale data because of the intervening optical reading process, and that boundaries of document elements such as characters and other symbols are always found to form a closed loop. Further, accuracy of detected edge positions is not needed as much as in analysis of architecture images or aerial photographs. Rather, boundaries need to be extracted such that features valuable for recognition are retained.

Moreover, Pavlidis, Chen, and Joseph disclose that a trade-off exists between a gray-scale level of each pixel and resolution of an image (T. Pavlidis, M. Chen, and E. Joseph, "Sampling and Quantization of Bilevel Signals," Pattern Recognition Letters, vol.14, no.7, pp.559–562, July 1993). In particular, document images do not require a large number of gray-scale levels to properly represent images when resolution is high, whereas the document images need a larger number of gray-scale levels as image resolution is lowered.

Many binarization methods determine a threshold value based on statistical characteristics of a gray-scale-value distribution. If an image has a low resolution, available data points are limited in number, and statistical estimation should suffer a decline in accuracy. In consideration of this, a method of extracting features is required so that extracted features prove to be valuable for recognition purposes even when images are provided in a low resolution.

Accordingly, there is a need for a feature-extraction method and a feature-extraction device which extract features from gray-scale document images, and extract boundaries of document elements such as characters and symbols based on the extracted features, thereby helping to utilize the vast resources of boundary-based recognition algorithms.

Further, there is a need for a feature-extraction method and a feature-extraction device which extract boundaries of document elements without use of differential operations that would bring about unstable results in digital images.

Moreover, there is a need for a feature-extraction method and a feature-extraction device which reliably extract boundaries of document elements even when gray-scale images have a low resolution.

SUMMARY OF THE INVENTION

Accordingly, it is a general object of the present invention to provide a feature-extraction method and a feature-extraction device which satisfy the needs described above.

It is another and more specific object of the present invention to provide a feature-extraction method and a feature-extraction device which extract features from gray-scale document images, and extract boundaries of document elements such as characters and symbols based on the extracted features, thereby helping to utilize the vast resources of boundary-based recognition algorithms.

It is still another object of the present invention to provide a feature-extraction method and a feature-extraction device which extract boundaries of document elements by avoiding use of differential operations that would bring about unstable results in digital images.

It is yet another object of the present invention to provide a feature-extraction method and a feature-extraction device which reliably extract boundaries of document elements even when gray-scale images have a low resolution.

In order to achieve the above objects according to the present invention, the method of extracting features from a gray-scale image includes the steps of generating polygons which approximate a curved surface represented by the gray-scale image, extracting features with respect to common edges of adjoining polygons, and generating boundaries of document elements based on the features.

Since the above method extracts the boundaries of document elements, vast resources of boundary-based recognition algorithms can be utilized. Further, the boundaries are extracted directly from the gray-scale image without a binarization process which is prone to statistical errors when the number of data points is small, so that boundaries are reliably obtained even when the image has a low resolution.

According to one aspect of the present invention, the above step of extracting features includes the steps of cutting the surface by a horizontal plane to generate intersection lines between the horizontal plane and the polygons around each one of the common edges, extracting directional features with respect to each one of the common edges based on the intersection lines, and extracting convex/concave features with respect to each one of the common edges based on the intersection lines. Here, the directional features indicate a general direction which a corner formed by the intersection lines faces, and the convex/concave features indicate whether a given one of the common edges is convex or concave.

Since no differential operations are involved in the steps of extracting the directional features and the convex/concave features, the stable boundaries are obtained.

Other objects and further features of the present invention will be apparent from the following detailed description when read in conjunction with the accompanying drawings.

BRIEF DESCRIPTION OF THE DRAWINGS

FIG. 12 is an illustrative drawing showing a weighted directional graph with regard to the example shown in FIGS. 10 and 11;

DETAILED DESCRIPTION OF THE PREFERRED EMBODIMENTS

In the following, embodiments of the present invention will be described with reference to the accompanying drawings.

Figure 1:
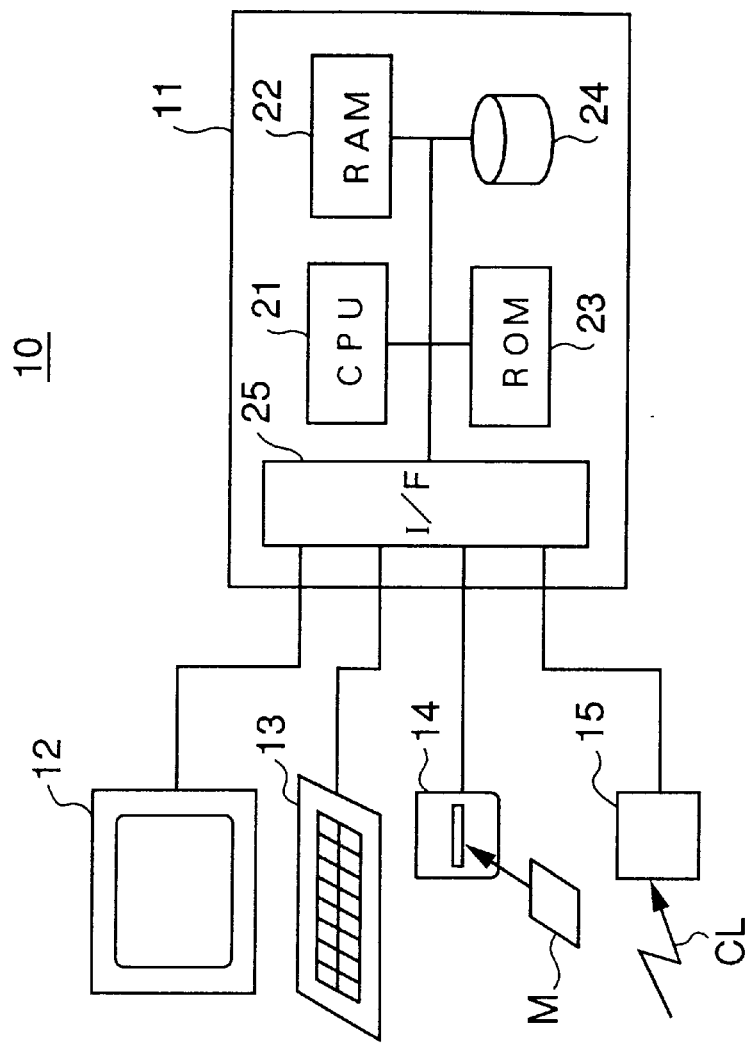
FIG. 1 is an illustrative drawing showing a device for extracting features according to the present invention.

FIG. 1 is an illustrative drawing showing a device for extracting features according to the present invention.

A device 10 of FIG. 1 includes a computer 11, a display device 12, an input device 13, an external memory device 14, and a modem 15. The computer 11 includes a CPU 21, a RAM 22, a ROM 23, a secondary memory 24, and an interface 25.

The input device 13 includes such devices as a keyboard and a mouse, and is used for operating the computer 11. The display device 12 displays various information such as characters and images in appropriate forms, and provides an operator with necessary information inclusive of results of operations to help in operating the computer 11.

The CPU 21 performs various processes including those associated with the present invention such as feature extraction, boundary tracing, binary-image generation, etc. The RAM 22 stores data and programs, and, also, provides a memory space for executed processes. The CPU 21 executes the programs to process the data by using the memory space. The ROM 23 mainly stores basic data and programs for controlling the computer 11. The secondary memory 24 may be a hard disk, and is used for storing the data and programs mainly for the purpose of providing a large storage capacity in addition to the RAM 22 and the ROM 23. The interface 25 connects the computer 11 with external devices such as the display device 12, the input device 13, the external memory device 14, and the modem 15.

The external memory device 14 includes a floppy-disk drive, a CD-ROM device, a hard drive, etc., and reads information from or writes information to a memory medium M. The programs used in the present invention may be provided via the memory medium M.

The modem 15 is connected to a communication line CL so as to allow the computer 11 to exchange information via the communication line CL. The programs used in the present invention may be provided via the communication line CL.

When programs recorded in computer-usable media are referred to, such programs may be recorded in the memory medium M, the RAM 22, the ROM 23, the secondary memory 24, or any storage connected via the communication line CL.

Figure 2:
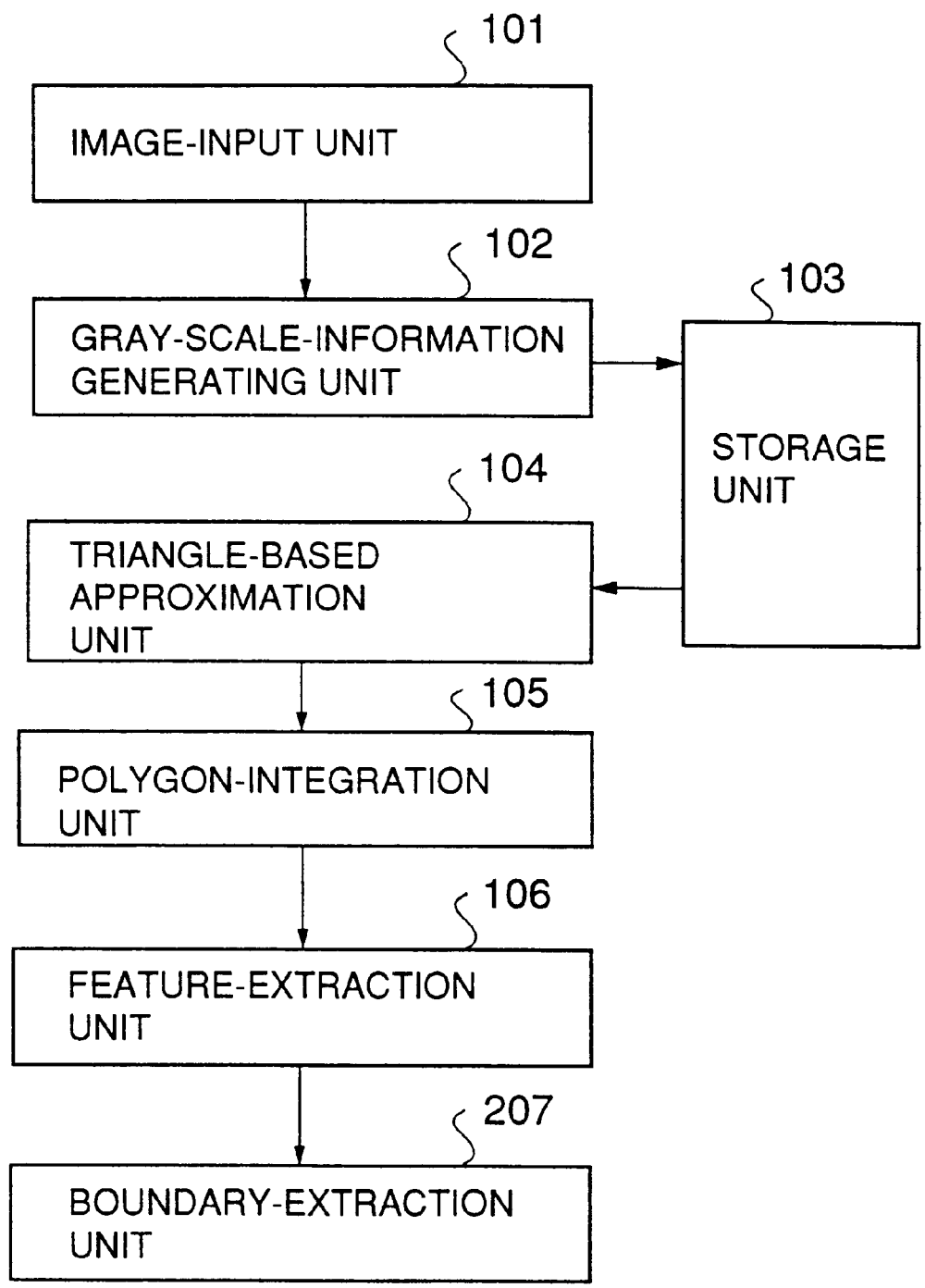
FIG. 2 is a functional block diagram of the feature-extraction device according to the embodiment of the present invention.

FIG. 2 is a functional block diagram of the feature-extraction device according to the embodiment of the present invention.

The feature extraction device of FIG. 2 includes an image-input unit 101, a gray-scale-information generating unit 102, a storage unit 103, a triangle-based approximation unit 104, a polygon-integration unit 105, a feature-extraction unit 106, and a boundary-extraction unit 207.

The image-input unit 101 reads document images of documents, and generates image data having gray-scale levels. The gray-scale-information generating unit 102 generates curved-surface data representing a curved surface in 3-dimensional space by using the gray-scale levels as elevation of the curved surface at each point. The storage unit 103 stores the curved-surface data. The triangle-based approximation unit 104 approximates the curved-surface data stored in the storage unit 103 by a surface comprised of triangles. The polygon-integration unit 105 integrates neighboring triangles adjacent to each other so as to create polygons. The feature-extraction unit 106 extracts features with respect to common edges of adjoining polygons. The boundary-extraction unit 207 extracts boundaries of document elements such as characters and other symbols by using the features extracted with respect to the common edges of adjoining polygons.

Figure 3:
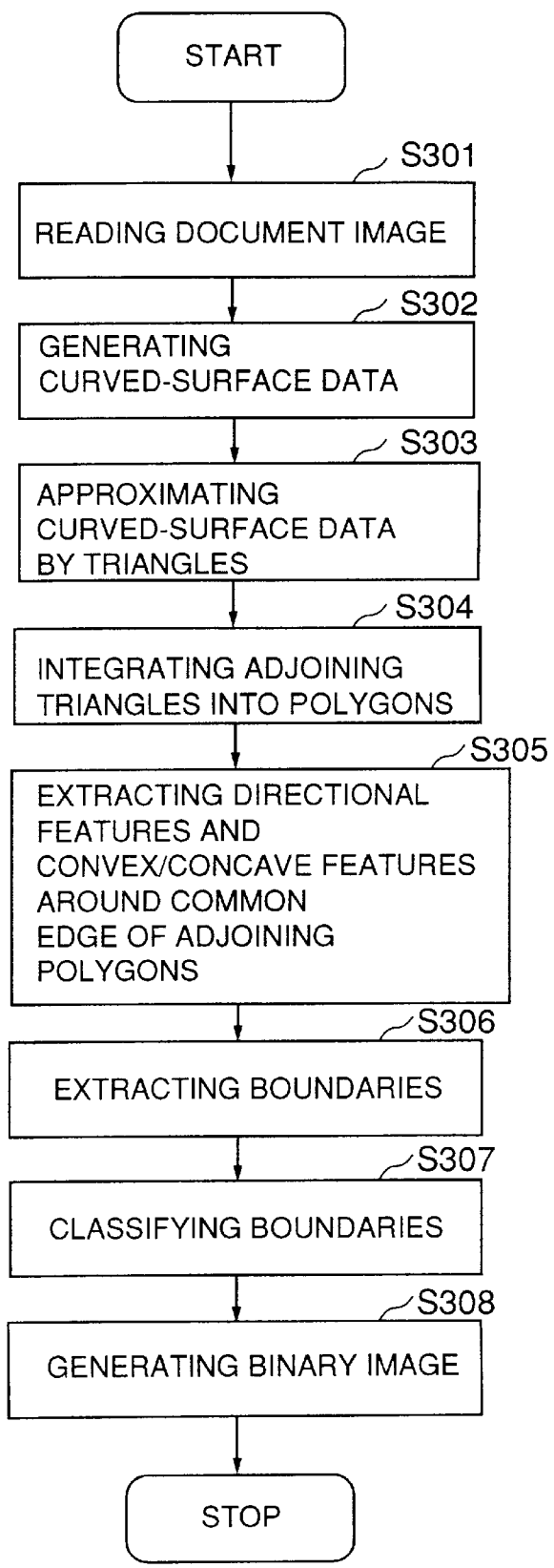
FIG. 3 is a schematic flowchart of a process of extracting features in the feature-extraction device according to the embodiment of the present invention.

FIG. 3 is a schematic flowchart of a process of extracting features in the feature-extraction device according to the embodiment of the present invention. In what follows, the method of feature extraction will be described with reference to accompanying drawings.

In FIG. 3, at a step S301, the image-input unit 101 reads document images on documents, and generates image data having gray-scale levels, which is then stored in the storage unit 103. The gray-scale image data stored in the storage unit 103 is represented as a two-dimensional array, in which each array elements are integers indicating respective gray-scale levels.

Figure 4:
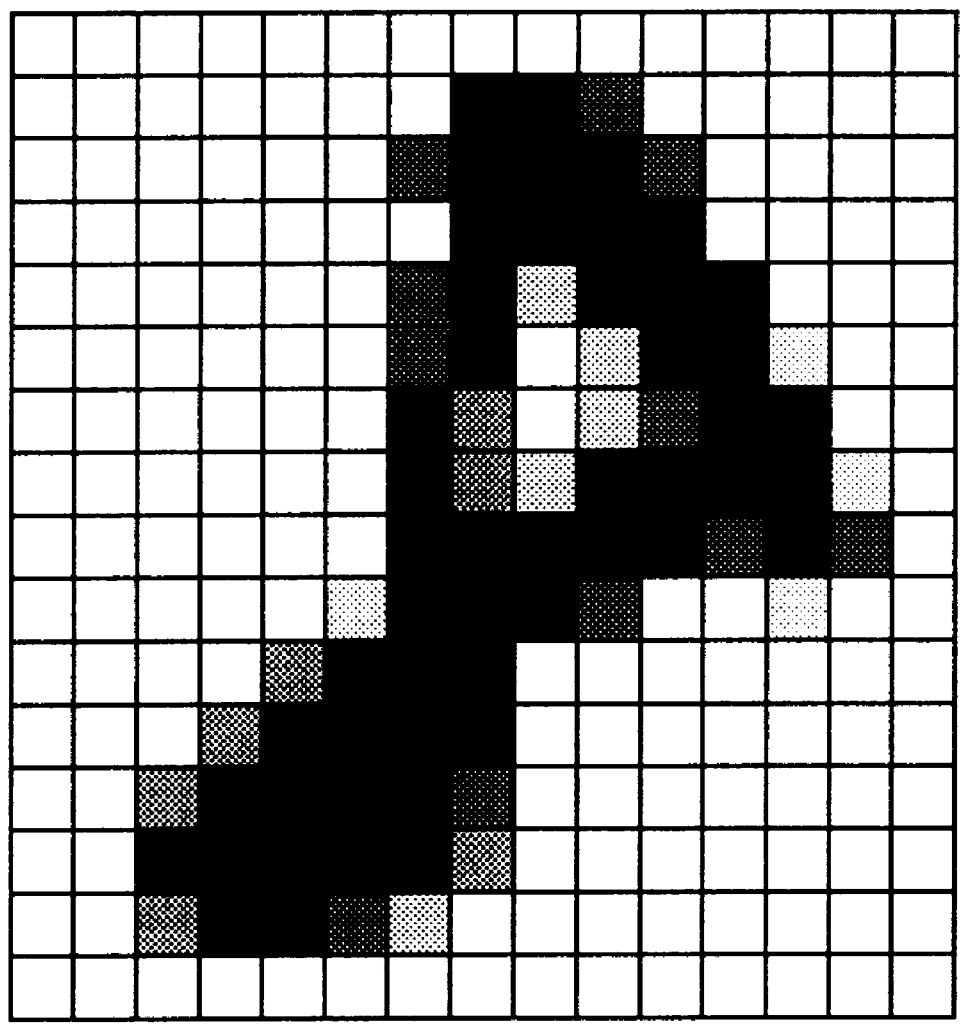
FIG. 4 is an illustrative drawing showing an example of gray-scale image data with regard to a certain character.

At a step S302, the gray-scale-information generating unit 102 generates curved-surface three-dimensional data by treating the gray-scale levels as elevation of a curved surface at each point. Namely, each gray-scale level is regarded as a height of a point on the curved surface at a corresponding 2-dimensional position. In this manner, the gray-scale image data is treated as a curved surface. FIG. 4 is an illustrative drawing showing an example of gray-scale image data with regard to a certain character.

At a step S303, the triangle-based approximation unit 104 approximates the curved-surface data by using triangles. Namely, the curved surface is divided and represented by triangle patches based on a certain algorithm of a triangle-based approximation.

Such an algorithm can be found, for example, in L. De Floriani, "A pyramidal data structure for triangle-based surface description," IEEE Computer Graphics and Applications, vol. 9, pp. 67–78, March 1989).

Figure 5:
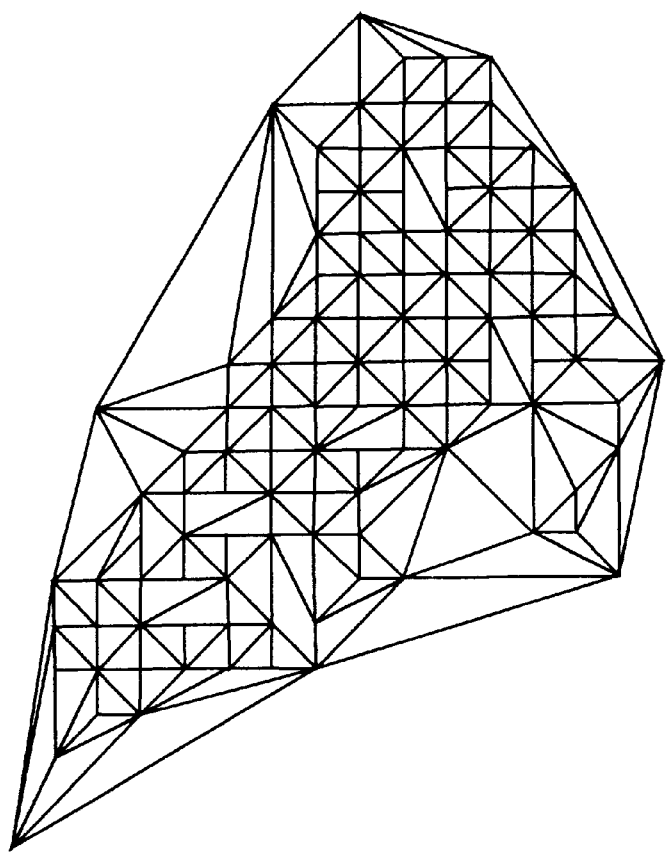
FIG. 5 is an illustrative drawing showing triangle-based division of the gray-scale image data of FIG. 4.

The algorithm of this publication represents a curved surface by using triangles in a hierarchical manner based on the Delaunay triangulation such that a maximum error between each triangle and the curved surface in a vertical direction falls within a predetermined parameter range. This parameter represents accuracy of approximation. FIG. 5 is an illustrative drawing showing triangle-based division of the gray-scale image data of FIG. 4.

Following this, some data representation is derived in order to extract various features from the triangle-based approximation of the curved surface. In doing so, directional features and convex/concave features are taken into consideration.

At a step S304, the polygon-integration unit 105 integrates adjacent triangles into polygons among the triangles used for approximation at the step S303. In detail, a direction which each triangle faces is represented by a normal vector, and directions of normal vectors are quantized by quantization steps. Adjacent triangles are integrated into a polygon if these triangles have normal vectors falling within the same quantization step.

In order to make use of quantization direction codes, an origin O, an X axis (base vector e1), a y axis (base vector e2), and a z axis (base vector e3) are defined in the image space. The z axis is taken in a vertical direction. In this manner, orthogonal coordinates $\Sigma=(O; e1, e2, e3)$ are defined.

Direction in 3-dimensional space is quantized by using a parameter N (positive even number), which determines how finely directions are quantized. Details of this quantization will be described in the following.

Figure 6:
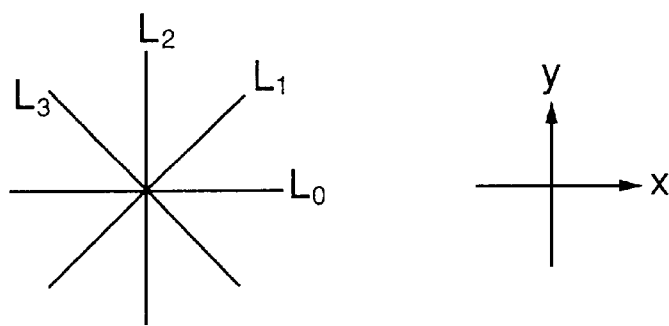
FIG. 6 is an illustrative drawing showing quantization of direction on the 2-dimensional plane when a quantization parameter is equal to 4.

First, N lines Li (i=0, 1, ..., N−1) are defined on the x-y plane as lines passing through the origin. FIG. 6 is an illustrative drawing showing quantization of direction on the 2-dimensional plane when N is equal to 4. A unit vector along the line Li is given as $(\cos(i/N\pi), \sin(i/N\pi))$.

A plane Pi having the line Li thereon and being vertical to the x-y plane is defined with respect to each line Li (i=0, 1, ..., N−1). On the plane Pi, a set of N lines passing through the origin are defined as {Lij: j=0, 1, ..., N=1}. Here, a unit vector along the line Lij (i,j=0, 1, ..., N−1) is represented as:

$$u_{ij,0} = \cos(i/N\pi)\cos(i/N\pi)e1 + \sin(i/N\pi)\cos(i/N\pi)e2 - \sin(j/N\pi)e3$$

A unit vector facing the opposite direction to the unit vector uij,0 is hereinafter denoted as uij,1 (i.e., uij,1=−uij,0). Then, a quantization direction code (p, d) (p=0, 1, ..., N−1; d=0, 1, ..., 2N−1) can be defined such that a direction code (i,j) is assigned to the direction of the unit vector uij,0 and a direction code (i, N+j) is assigned to the direction of the unit vector uij,1. As a different form of representation, a direction code (i, 0) (i=0, 1, ..., N−1) on the horizontal plane is also expressed as (N, i) by indicating the parameter N and the direction i on the horizontal plane.

Figure 7:
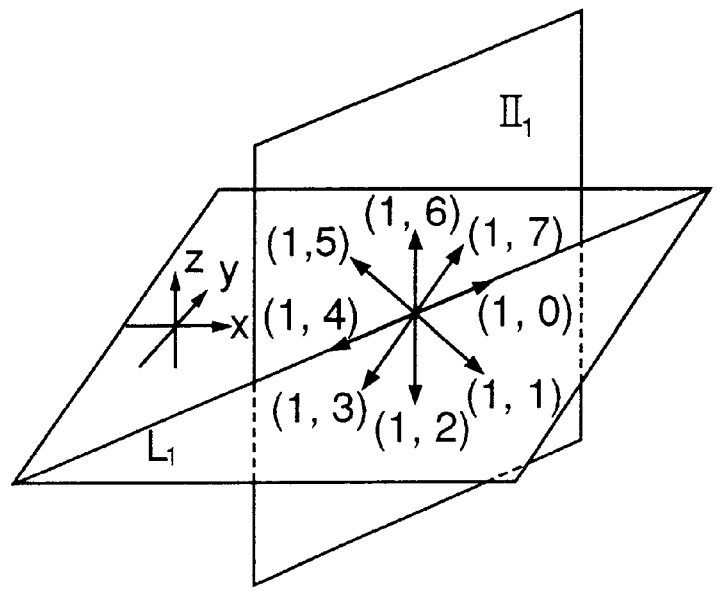
FIG. 7 is an illustrative drawing showing a vertical plane and direction codes thereon when the quantization parameter is equal to 4.
Figure 8:
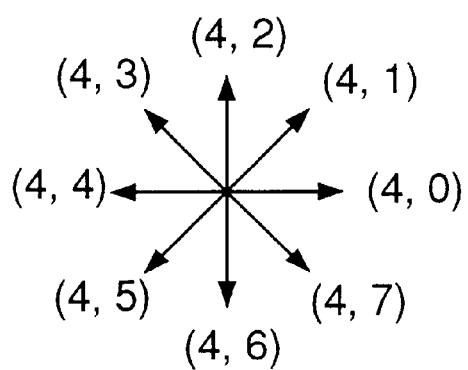
FIG. 8 is an illustrative drawing showing direction codes (4, 0), (4, 1), . . . , (4, 7) when the quantization parameter is equal to 4.

FIG. 7 is an illustrative drawing showing a vertical plane Pi and direction codes thereon when the parameter N is equal to 4. As can be seen, direction codes (1, 0), (1, 1), ..., (1, 7) represent directions in 3-dimensional space which are on the plane Pi. FIG. 8 is an illustrative drawing showing direction codes (4, 0), (4, 1), ..., (4, 7) when the parameter N is equal to 4.

Normal directions of the triangles obtained for approximation are classified into $2N^2$ intervals by using quantization directions. If two unit vectors u and v related with each other as u=−v are regarded as vectors in the same direction, each interval D(i,j) (i=0, 1, ..., 2N−1; j=0, 1, ..., N−1) is defined by using a unit vector representing a given direction within a given interval.

$$D(i,j) = \{(\cos\Theta\cos\phi, \sin\Theta\cos\phi, -\sin\Theta): i/N\pi<\Theta<(i+1)/N\pi, j/N\pi<\phi<(j+1)/N\pi\}$$

(i=0, 1, ..., 2N−1; j=0, 1, ..., N−1)

The quantization direction intervals defined in the above are used in the integration of adjacent triangles. Namely, the adjoining triangles which have normal directions falling within the same intervals are integrated to form a polygon.

Figure 9:
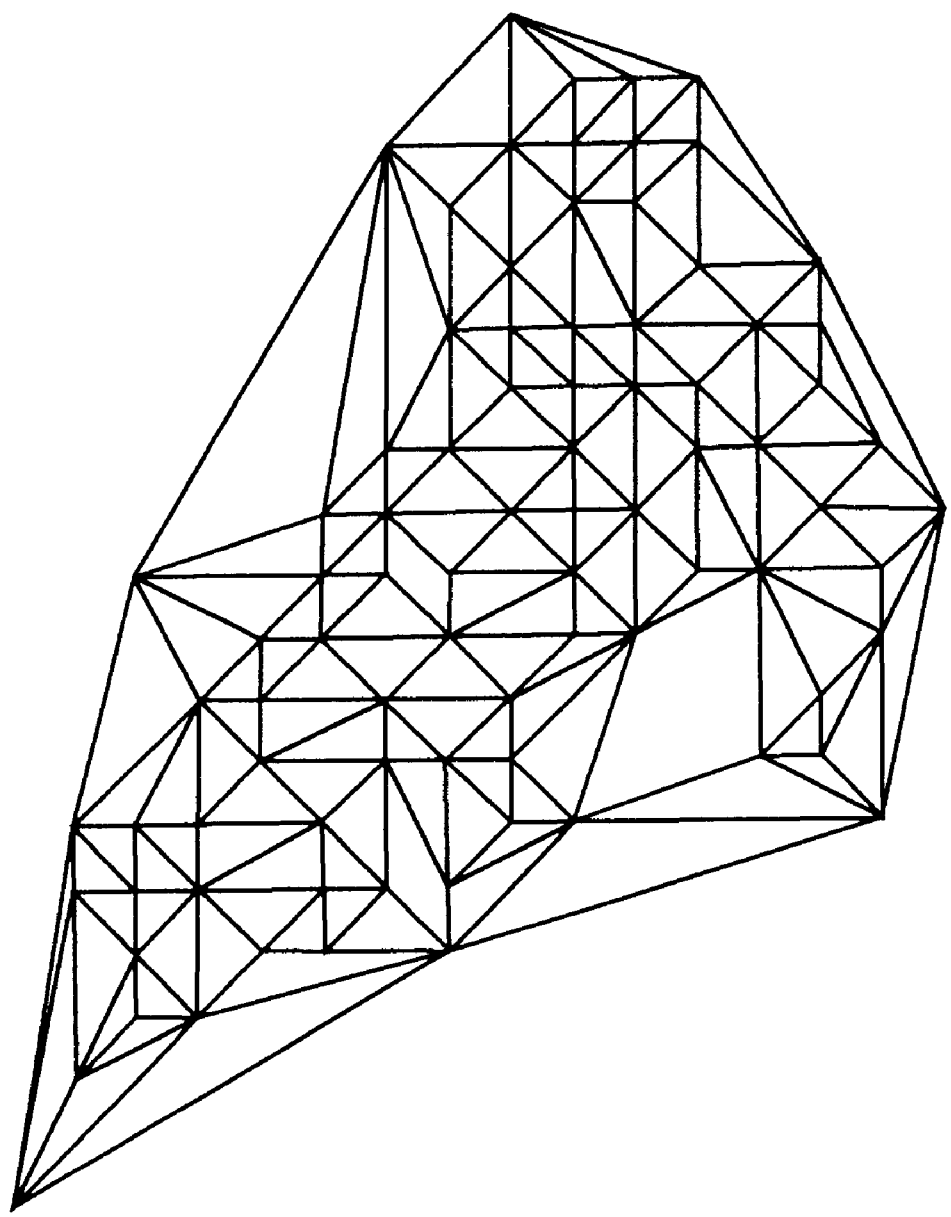
FIG. 9 is an illustrative drawing showing polygon patches which are obtained by integrating triangles of FIG. 5.

Normal directions, $(\cos(i/N\pi)\cos\phi, \sin(i/N\pi)\cos\phi, -\sin\phi)$ (i=0, 1, ..., 2N−1; $\phi$ is arbitrary) or $(\cos\Theta\cos(j/N\pi), \sin\Theta\cos(j/N\pi), -\sin(j/N\pi))$ (Θ is arbitrary; j=0, 1, ..., N−1) correspond to boundaries of the intervals, so that triangles having such normal directions are given slight displacement in a vertical direction in order to slightly adjust the normal directions. FIG. 9 is an illustrative drawing showing polygon patches which are obtained by integrating the triangles of FIG. 5.

This integration is optional rather than mandatory, and reduces the number of polygon patches (inclusive of triangle patches) with an aim of reducing the amount of calculation in the following steps.

With reference back to FIG. 3, at a step S305, the feature-extraction unit 106 extracts features around edges which are defined by intersections between adjoining polygons obtained at the step S304. In this context, the term "polygon" is used to refer to all the polygon patches inclusive of triangles which have not been integrated into larger patches. In extracting features, a horizontal plane cutting the surface is placed around an edge to intersect adjoining polygons, and intersection lines between the adjoining polygons and the horizontal plane are looked into. From these intersection lines, directional features and convex/concave features are obtained with respect to each edge.

Figure 10:
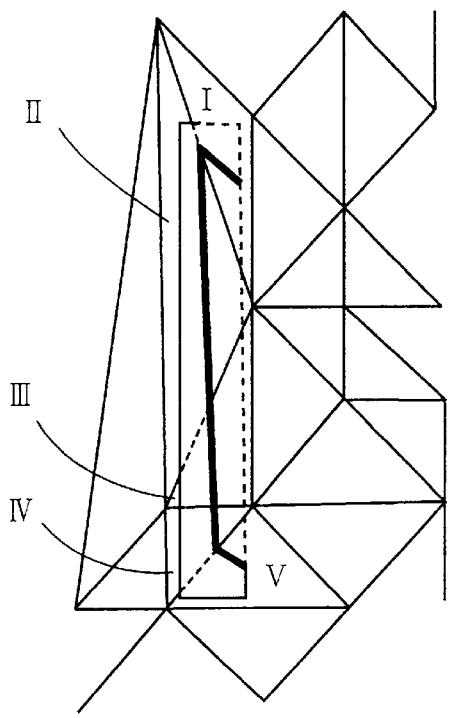
FIG. 10 is an illustrative drawing showing intersection lines between polygons and a horizontal plane.

Two adjoining polygons are denoted here, in the text, as a and b. Intersection lines between the polygons a and b and the horizontal plane are denoted as C(a, b). FIG. 10 is an illustrative drawing showing intersection lines between polygons and a horizontal plane. What is shown in FIG. 10 is a portion of FIG. 9 expanded in size. In FIG. 10, intersection lines are drawn in thick lines.

Concave-convex features on a common edge of the polygons a and b are defined as follows. A point where the intersection lines C(a, b) meet the common edge of the polygons a and b is denoted in the text as P. Further, a point Pa is defined on the intersection lines C(a, b) as a point which is sufficiently close to the point P and is on the polygon a. By the same token, a point Pb is defined on the intersection lines C(a, b) as a point which is sufficiently close to the point P and is on the polygon b. If an outer product PPa×PPb is negative, a connection between the polygons a and b is represented as a→b. If the outer product is positive, the connection is represented as b→a. In this manner, a feature of the connection as to whether it is concave or convex is obtained.

Further, a directional feature of the connection between the polygons a and b will be obtained based on a comparison of a height function between the three points P, Pa, and Pb. Here, the height function of a point (x, y, z) is defined with respect to a horizontal line Li (i=0, 1, ..., N−1) as:

$$hi(x, y, z) = x\cos(i/N\pi) + y\sin(i/N\pi)$$

If the height function hi is the largest at the point P, the connection between the polygons a and b with respect to the line Li on the horizontal plane is provided with a direction code (i, 0), which can also be represented as (N, i) in the other form of representation. If the height function hi is the smallest at the point P, the connection is provided with a direction code (i+N, 0), which is (N, i+N) in the other form of representation. Cases other than those indicated above means that the height function hi shows a monotonous change along the intersection lines C(a, b). In these cases, no direction code is provided.

The height function hi is a length of a projection when the vector (x, y, z) is projected onto the line Li. If a direction code (N, i) is assigned to the line Li, this means that a corner comprised of the polygons a and b generally faces a direction indicated by the direction code (N, i). More than one direction code may be assigned to one common edge of two polygons. It might be easier to understand this situation if general terms for indicating directions such as North, North-West, etc. are used. A given corner may face a direction between North and North-West. In this case, two direction codes corresponding to North and North-West are assigned to the given corner. By the same token, when a direction code (N, 2) is assigned to a given edge, a direction code (N, 1) and/or even a direction code (N, 3) may also be assigned to the same edge.

For the common edge of the polygons a and b, direction codes with respect to lines Li are then arranged in series as:

((N, j(i)), (N, j(2)), ..., (N, j(m))

where m is the number of provided direction codes, and j(k+1) is defined as:

$$j(k+1) \equiv j(k)+1 (\mod 2N,$$

(k=1, 2, ..., m−1)

This simply means that j(1) through j(m) are successive integers like 2 through 4 (2, 3, and 4), and that there is a continuity between 2N−1 and 0 so that a series of 2N−2, 2N−1, and 0 is also regarded as successive integers.

Then, the first element and the last element of this series are used for representing the convex/concave feature and the directional feature with regard to the connection between the polygons a and b as:

$$a\text{–}(j(1), j(m))\rightarrow b$$

Figure 11:
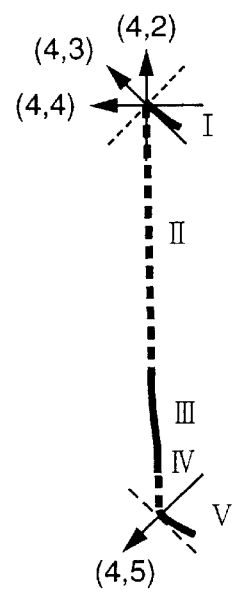
FIG. 11 is an illustrative drawing showing convex/concave features and directional features obtained between adjoining polygons of FIG. 10.

FIG. 11 is an illustrative drawing showing convex/concave features and directional features obtained between adjoining polygons of FIG. 10. FIG. 11 shows the convex/concave features and directional features with regard to five polygons I, II, III, IV, and V of FIG. 10, and shows a case in which the parameter N is 4. In FIG. 11, no directional feature is assigned to a pair of the polygons II and III or to a pair of the polygons III and IV.

In FIG. 11, I−(2, 4)→II, for example, means that a corner formed by the polygons I and II faces a direction which falls within a range between a direction of a line L2 and a direction of a line L4. A common edge of the polygons I and II is relatively sharp, so that three direction codes (4, 2), (4, 3), and (4, 4) are assigned to this edge. On the other hand, a common edge of the polygons IV and V is relatively dull, so that only one direction code (4, 5) is assigned to this edge.

In place of the horizontal plane, a vertical plane Pi (i=0, 1, ..., N−1) is also used for obtaining the convex/concave directional features on the plane Pi with regard to connections between adjoining polygons. In calculating the outer products and the height function, however, different coordinates are used in which the base vector e3 coincides with a direction along the x axis toward the positive side, a unit vector uij,0 coincides with a direction along the z axis toward the positive side, and the outer product uij,0 x e3 coincides with a direction along the y axis toward the positive side.

In the above, the gray-scale data obtained from the document image is treated as a curved surface by regarding gray-scale values as elevation, and the data representation is obtained to take into account the directional feature and the convex/concave feature. In the following, a method of extracting boundary lines of document elements such as characters based on this data representation will be described.

Boundaries are closed loops which are obtained by tracing points of steep gradient on the curved surface of the gray-scale data. Although a single boundary in its entirety does not usually lie on a single plane, it can be approximated by a horizontal line segment when viewed locally. In the data representation described above using polygons for representing a curved surface, a closed loop can be created by joining together edges of steep polygons which locally share the same intersecting horizontal plane. When this closed loop is obtained so as to best meet certain criteria, this ends up providing a boundary. In the following, this method of extracting a boundary will be described in detail.

An edge B(a,b) between different polygons a and b as well as an edge B(c, d) between different polygons c and d are taken into consideration. Here, the polygon b and the polygon c may be the same polygon. In a proximity of these edges B(a, b) and B(c, d), the convex/concave features and the directional features on a horizontal plane are assumed to be represented by one of the following forms.

(1) a–(j0, j1)→b, c–(j2, j3)→d
(2) a–(j0, j1)→b, d–(j2, j3)→c
(3) b–(j0, j1)→a, c–(j2, j3)→d
(4) b–(j0, j1)→a, d–(j2, j3)→c

Further assume that there is a path comprised of a series of polygons, (e0=b, e1, . . . , em−1, em=c) (m≧2)

between the polygon b and the polygon c when the polygons b and c are different, and that no directional feature on the horizontal plane is assigned to edges between the polygons ei and ei+1 (i=1, 2, . . . , m−1). This assumption is tantamount to the fact that the height function hi exhibits a monotonous change along the intersection lines C(ei, ei+1), which are intersection lines between the polygons ei and ei+1 and the horizontal line.

When there is a horizontal plane which intersects all of the polygons of the polygon series (a, b, e1, . . . , em−1, c, d), it can be shown that the following relations hold between the four integers j0, j1, j2, j3 which appear in the above representation (1) through (4).

(i) j2−j1≡1 (mod 2N)
(ii) j3−j1≡N (mod 2N)
(iii) j2−j0≡N (mod 2N)
(iv) j0−j3≡1 (mod 2N)

By using these characteristics (i) through (iv), a neighboring edge sharing the same intersecting horizontal plane with the polygon edge B(a, b) can be found. That is, if the edge B(a, b) and the edge B(c, d) satisfy one of these characteristics (i) through (iv), the edge B(c, d) is found as a candidate of a next edge when a boundary is traced one edge after another from the edge B(a, b). The characteristics (i) and (iv) specifies a case in which two edges are the same type with regard to whether they are convex or concave, and the characteristics (ii) and (iii) relate to a case where two edges are opposite types.

The characteristic (i), for example, means that both the edges B(a, b) and B(c, d) are the same type in terms of convex/concave features, and that directional continuity is kept when tracing edges from the edge B(a, b) to the edge B(c, d). In FIG. 11, for example, the common edge of the polygons I and II has j1=4, and the common edge of the polygons IV and V has j2=5, so that a direction of the former edge is continuous with a direction of the latter edge.

Many neighboring edges may be found in the above process. In such a case, some limitations are imposed to reduce the number of neighboring edges.

As stated above, the objective here is to join together edges of steep-gradient polygons which locally share the same intersecting horizontal plane so as to extract a boundary. To this end, when the edge B(a, b) is considered, only those edges which have a sufficiently small value of a function f are selected as the neighboring edge. Here, the function f is a monotonously increasing function such as:

f(α, dz)=sin(α(B'))+c dz(B(a, b), B')

where α(B') is an angle between a vertical line and an edge B' that is a candidate for a neighboring edge of the edge B(a, b). Further, dz(B(a, b), B') is a difference between a midpoint height (an average height between the highest point and the lowest point) of the edge B' and a midpoint height of the edge B.

The criteria for choosing the neighboring edges may be stipulated as follows. A value of the function f, f0=min$_{B'}$f(α(B'), dz(B(a,b), B'))

is first determined. Then, only those edges which have the value of the function f smaller than the value f0+t (t is a positive constant) are chosen as neighboring edges.

As described above, when a pair of polygons a and b is considered, the characteristics derived from the convex/concave feature and the directional feature on the horizontal plane in proximity of a given edge are taken into consideration, and, also, the evaluation function is appraised based on an angle of the given edge relative to the vertical line and a difference between the midpoint height of the given edge and the midpoint height of the edge B(a, b). This results in neighboring edges of a steep gradient being found such that any neighboring edge shares the same intersecting horizontal plane with the edge B(a, b).

Further, a weighted directional graph in which polygon edges are treated as nodes is created in order to extract boundaries of document elements such as characters.

With respect to a neighboring edge β found for the edge B(a, b), a weighted directional link B(a, b)–w→β is provided in which the value of the weight w is the value of the above-described evaluation function f(α(β), dz(B(a,b), β)). In this directional graph, the edge B(a, b) is treated as a different node from the edge B(b, a). FIG. 12 is an illustrative drawing showing a weighted directional graph obtained in this manner with regard to the example shown in FIGS. 10 and 11.

The step S305 described above is rather complex. For the purpose of facilitating understanding, a summary of the step S305 will be provided below.

Figure 13:
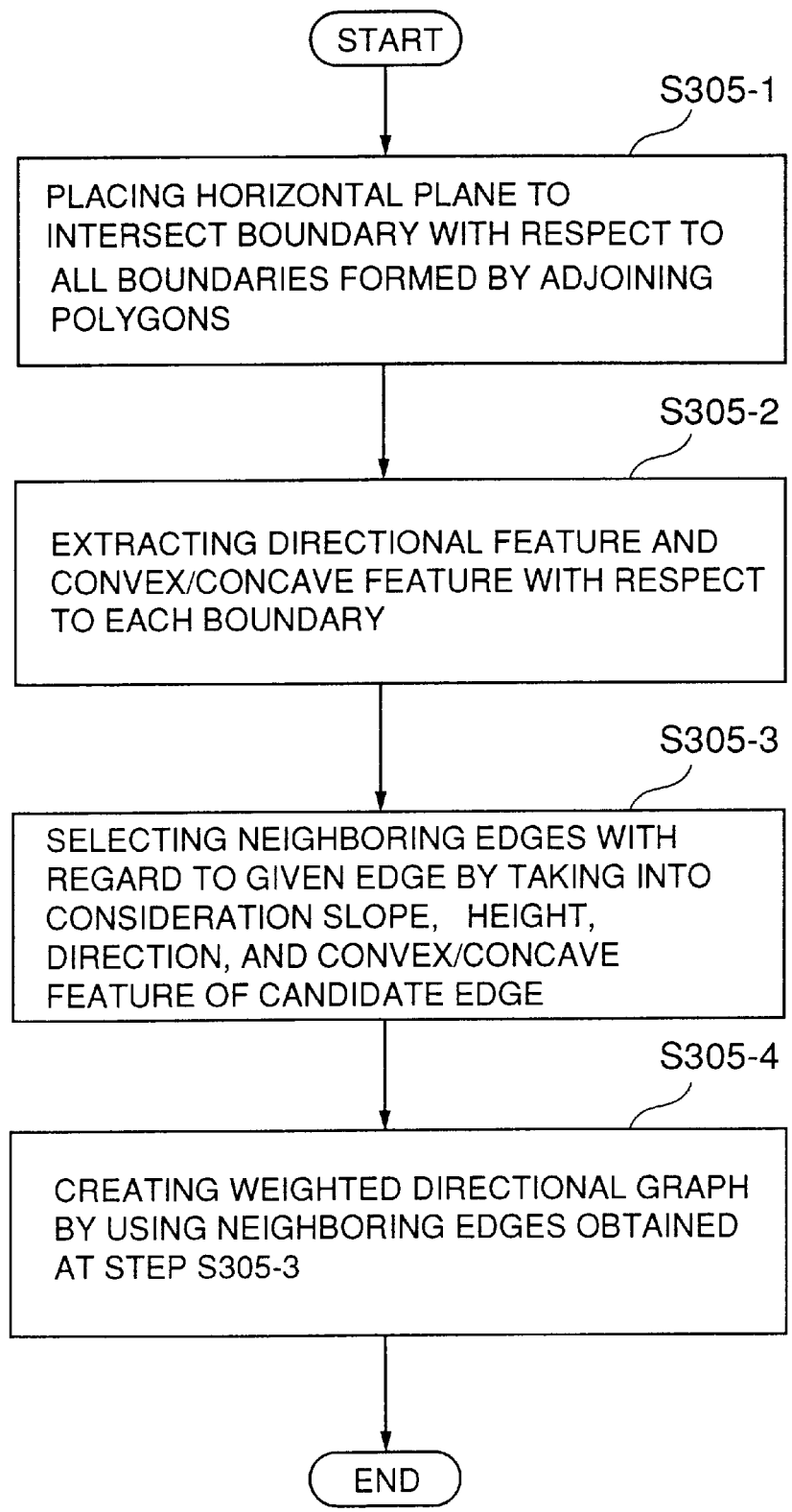
FIG. 13 is a detailed flowchart of a process performed at the step S305 of FIG. 3.

FIG. 13 is a flowchart of a process performed at the step S305.

At a step S305-1, a horizontal plane is placed to intersect a boundary with respect to all the boundaries formed by adjoining polygons.

At a step S305-2, a directional feature and a convex/concave feature are extracted with respect to each boundary.

At a step S305-3, neighboring edges are selected with regard to a given edge by taking into consideration a slope, a height, a direction, and a convex/concave feature of a candidate edge. The steeper the slope of the candidate edge, the more likely this edge is chosen as a neighboring edge. The closer the height of the candidate edge to the height of the given edge, the more likely this edge is chosen as a neighboring edge. The direction of the candidate edge should keep directional continuity with the direction of the given edge, as stipulated in the characteristics (i) through (iv) described above. Finally, the convex/concave feature is used for determining an order of polygon connection as to whether the polygons a and b are connected to the polygons c and d in this order or the polygons a and b are connected to the polygons d and c in this order, for example. The conditions for such polygon connections are also stipulated in the characteristics (i) through (iv).

At a step S305-4, a weighted directional graph is created by using the neighboring edges obtained at the step S305-3.

In this manner, the step S305 of FIG. 3 extracts various features, and finds neighboring edges to form a weighted directional graph. This prepares for a boundary extraction process, which will be described below.

With reference back to FIG. 3, at a step S306, the boundary-extraction unit 207 extracts boundaries of document elements such as characters and other symbols based on the features around edges between adjoining polygons. Here, the boundaries of document elements are extracted by using the weighted directional graph obtained in the above.

First, the steepest edge is selected from all the polygon edges, and a node s corresponding to the steepest edge is found in the directional graph. As previously stated, the edge B(a, b) and the edge B(b, a) are treated as different nodes, but whichever can be chosen as the steepest edge.

From the node s, the shortest path to each node is obtained in the directional graph wherein a distance between two nodes is measured by the weight w. Then, a node t which has a directional link t→s is selected from nodes to which the node has a connecting path. In the directional graph, paths from the node s to the node t are traced while joining together midpoints of polygon edges corresponding to the nodes on the traced paths. At the end, midpoints are connected between two edges corresponding to the nodes t and s of the directional graph, thereby completing a closed boundary.

What is performed here is to join nodes (edges) together so as to form the shortest path starting from the node s and ending at the node s. Here, a next node from the node s is not selected because this next node has the shortest distance from the node s. Rather, the next node is chosen because the selection of this node achieves the shortest path overall. In other words, each node is selected from a global viewpoint rather than evaluating the distance (weight w) locally.

If there is more than one node t, a boundary is selected such that the longest path length is provided, for example. When a boundary is completed, nodes that form the completed boundary are deleted from the directional graph.

Further, other nodes in addition to the deleted nodes are also eliminated from the directional graph if these nodes belong to the same polygons as the deleted nodes.

Figure 14:
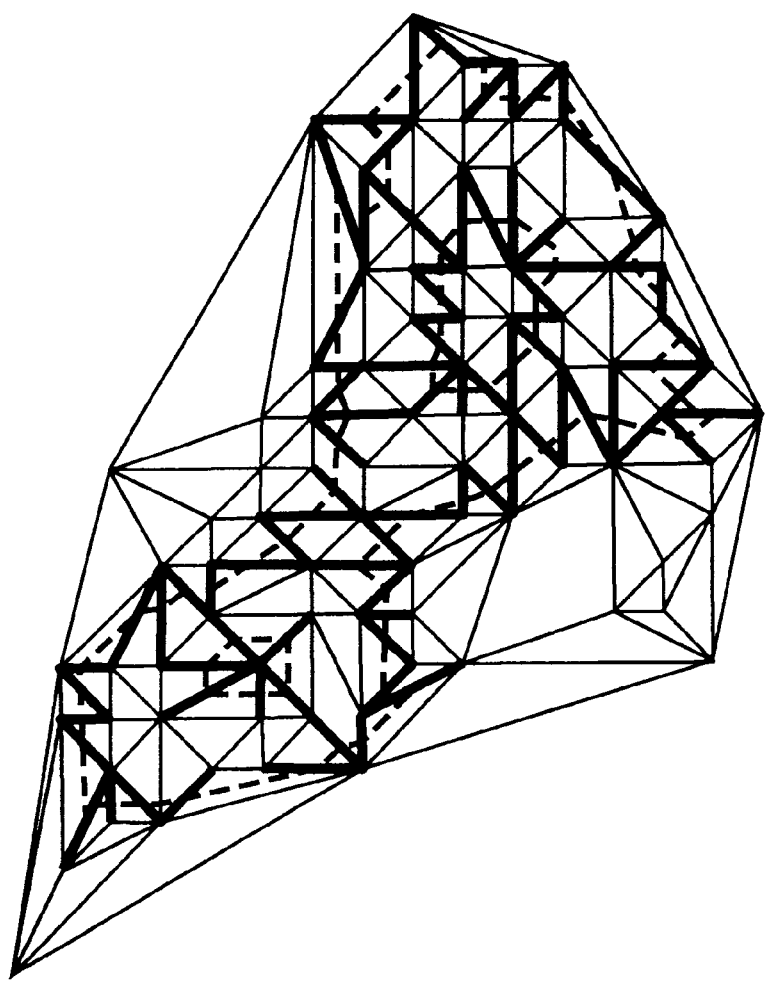
FIG. 14 is an illustrative drawing showing obtained boundaries and polygon edges contributing to these boundaries with regard to a polygon representation of FIG. 9.

In the updated directional graph, the steepest edge is again selected from the remaining edges, and the node s corresponding to the new steepest edge is identified in the directional graph. The procedure of finding a boundary as described above is repeated until no boundary can be found. FIG. 14 is an illustrative drawing showing boundaries obtained as described above and polygon edges contributing to these boundaries with regard to the polygon representation of FIG. 9.

With reference back to FIG. 3, at a step S307, the boundaries extracted at the step S306 are classified into one of inner boundaries and outer boundaries.

At a step S308, interiors of the boundaries are filled based on the classification of the boundaries into the inner boundary or the outer boundary, thereby producing a binary image.

The classification into the inner boundary or the outer boundary is readily made as follows. If a range of y coordinates of the lowest points of polygon edges which contribute to a given boundary contains a range of y coordinates of the given boundary, this is an indication that the outside of the boundary is lower in altitude than the boundary itself. In this case, the given boundary should be an outer boundary. Otherwise, the given boundary is ascertained as an inner boundary.

After classifying boundaries into the outer boundary or the inner boundary, interiors of the boundaries are filled to generate a binary image.

Further, the present invention is not limited to these embodiments, but variations and modifications may be made without departing from the scope of the present invention.

What is claimed is:

1. A method of extracting features from a gray-scale image, said method comprising the steps of:

a) generating polygons which approximate a curved surface represented by said gray-scale image;

b) extracting features with respect to common edges of adjoining polygons; and c) generating boundaries of document elements based on said features, wherein said step b) comprises the steps of b1) cutting said surface by a horizontal plane to generate intersection lines between said horizontal plane and said polygons around each one of said common edges, b2) extracting directional features with respect to each one of said common edges based on said intersection lines, and b3) extracting convex/concave features with respect to each one of said common edges based on said intersection lines.

2. The method as claimed in claim 1, wherein said step b2) comprising the step of extracting said directional features so as to indicate a general direction which a corner formed by said intersection lines faces, and said step b3) comprising the step of extracting said convex/concave features so as to indicate whether a given one of said common edges is convex or concave.

3. The method as claimed in claim 1, wherein said step c) comprises the steps of:

c1) finding one or more neighboring edges for each one of said common edges based on said directional features and said convex/concave features, each of said one or more neighboring edges sharing the same intersecting horizontal plane with a corresponding one of said common edges;

c2) selecting one of said one or more neighboring edges to move from one of said common edges to a next one of said common edges so as to successively choose some of said common edges; and c3) joining together points on said some of said common edges to form one of said boundaries.

4. The method as claimed in claim 3, wherein said step c1) comprises the step of finding a neighboring edge such that a direction indicated by said directional features shows a continuous displacement from a corresponding one of said common edges to said neighboring edge, and such that an evaluation function whose value increases with a decrease in steepness of said neighboring edge as well as an increase in a difference in height between said neighboring edge and said corresponding one of said common edges is less than a predetermined value.

5. The method as claimed in claim 3, wherein said step c2) comprises the steps of:

c2-1) assigning an evaluation function to a transition from a given one of said common edges to said one or more neighboring edges; and c2-2) selecting said some of said common edges so as to minimize a total value of said evaluation function with regard to all transitions made in selecting said some of said common edges.

6. The method as claimed in claim 5, wherein said step c2-1) defines said evaluation function for a neighboring edge as a function whose value increases with a decrease in steepness of said neighboring edge as well as an increase in a difference in height between said neighboring edge and said given one of said common edges.

7. The method as claimed in claim 1, wherein said step a) comprises the steps of:
   a1) generating triangles which approximate said curved surface represented by said gray-scale image; and
   a2) integrating adjoining triangles into a polygon with regard to at least some of said triangles so as to generate said polygons.

8. The method as claimed in claim 7, wherein said step a2) integrates said adjoining triangles if said adjoining triangles have normal vectors having directions which fall within the same predetermined range.

9. The method as claimed in claim 1, further comprising the steps of:
   classifying each of said boundaries into one of an outer boundary and an inner boundary; and
   filling interiors of said document elements based on classification as to whether a given boundary is said outer boundary or said inner boundary.

10. A device for extracting features from a gray-scale image, said device comprising:
    approximation means for generating polygons which approximate a curved surface represented by said gray-scale image;
    feature-extraction means for extracting features with respect to common edges of adjoining polygons; and
    boundary-extraction means for generating boundaries of document elements based on said features, wherein said feature-extraction means comprises,
    means for cutting said surface by a horizontal plane to generate intersection lines between said horizontal plane and said polygons around each one of said common edges,
    means for extracting directional features with respect to each one of said common edges based on said intersection lines, and
    means for extracting convex/concave features with respect to each one of said common edges based on said intersection lines.

11. The method as claimed in claim 10, wherein said boundary-extraction means comprises:
    means for finding one or more neighboring edges for each one of said common edges based on said directional features and said convex/concave features, each of said one or more neighboring edges sharing the same intersecting horizontal plane with a corresponding one of said common edges;
    means for selecting one of said one or more neighboring edges to move from one of said common edges to a next one of said common edges so as to successively choose some of said common edges; and
    means for joining together points on said some of said common edges to form one of said boundaries.

12. A computer usable medium having program code means embodied therein for causing a computer to extract features from a gray-scale image, said program code means comprising:
    approximation means for generating polygons which approximate a curved surface represented by said gray-scale image;
    feature-extraction means for extracting features with respect to common edges of adjoining polygons; and
    boundary-extraction means for generating boundaries of document elements based on said features, wherein said feature-extraction means comprises,
    means for cutting said surface by a horizontal plane to generate intersection lines between said horizontal plane and said polygons around each one of said common edges;
    means for extracting directional features with respect to each one of said common edges based on said intersection lines; and
    means for extracting convex/concave features with respect to each one of said common edges based on said intersection lines.

13. The computer usable medium as claimed in claim 12, wherein said boundary-extraction means comprises:
    means for finding one or more neighboring edges for each one of said common edges based on said directional features and said convex/concave features, each of said one or more neighboring edges sharing the same intersecting horizontal plane with a corresponding one of said common edges;
    means for selecting one of said one or more neighboring edges to move from one of said common edges to a next one of said common edges so as to successively choose some of said common edges; and
    means for joining together points on said some of said common edges to form one of said boundaries.

* * * * *